United States Patent [19]
Connor et al.

[11] Patent Number: 5,891,370
[45] Date of Patent: Apr. 6, 1999

[54] PROCESS FOR PRODUCING CELLULOSIC MOLDINGS

[75] Inventors: Hans-Georg Connor; Derek Budgell, both of Erlenbach, Germany

[73] Assignee: Akzo Nobel NV, Netherlands

[21] Appl. No.: 860,009

[22] PCT Filed: Dec. 11, 1995

[86] PCT No.: PCT/EP95/04873

§ 371 Date: Jun. 16, 1997

§ 102(e) Date: Jun. 16, 1997

[87] PCT Pub. No.: WO96/18761

PCT Pub. Date: Jun. 20, 1996

[30] Foreign Application Priority Data

Dec. 15, 1994 [DE] Germany .................... 44 44 700.0

[51] Int. Cl.[6] .............................. D01D 1/10; D01F 2/02; D01F 13/00

[52] U.S. Cl. ............... 264/37.2; 264/103; 264/169; 264/187; 264/209.1; 264/211.14; 264/211.15; 264/233

[58] Field of Search ................... 264/37.2, 103, 264/169, 187, 203, 209.1, 211.14, 211.15, 233

[56] References Cited

U.S. PATENT DOCUMENTS 4,748,241  5/1988  Scholten et al. .
5,189,152  2/1993  Hintenholzer et al. .
5,216,144  6/1993  Eichinger et al. .
5,409,532  4/1995  Astegger et al. .

FOREIGN PATENT DOCUMENTS 553 070 A1  7/1993  European Pat. Off. .
679739  11/1995  European Pat. Off. .

OTHER PUBLICATIONS

German Patent Examination Report (Dated Oct. 12, 1995).
Polymer Communications, vol. 27, p. 171, Jun. 1986, H. Chanzy et al., "Spinning of Exploded Wood From Amine Oxide Solutions".

Primary Examiner—Leo B. Tentoni
Attorney, Agent, or Firm—Oliff & Berridge, PLC

[57] ABSTRACT

A process for manufacturing formed objects such as fibers, filaments, yarns, films, membranes in form of flat membranes, hose membranes and hollow fiber membranes and the like, involves pressing cellulose solutions in an amine oxide of a tertiary amine and if necessary water, in particular in N-methylmorpholine-N-oxide and water, through a nozzle and precipitating the solutions in a coagulation bath and washing the formed objects obtained. The coagulation bath liquid and the washing water is processed, if necessary, for recovery of the amine oxide of the tertiary amine. Hydrogen peroxide, peroxyethanoic acid, ozone or chlorine dioxide is added to the coagulation bath and/or the washing water. The substances added can preferably be decomposed catalytically or by enzymes prior to the recovery process of the water and the solvent.

22 Claims, 1 Drawing Sheet

PROCESS FOR PRODUCING CELLULOSIC MOLDINGS

BACKGROUND OF THE INVENTION

1. Field of the Invention

The invention relates to a process for manufacturing cellulose formed objects such as fibers, filaments, yarns, films, membranes in the form of flat membranes, hose membranes, hollow fiber membranes and the like by forming cellulose solutions in an amine oxide of a tertiary amine and, if necessary, water.

2. Discussion of Related Art

It has long been known how to dissolve cellulose polymers in an amine oxide of a tertiary amine, if necessary in the presence of water, and to produce from these solutions, by means of pressing through nozzle tools, formed objects such as fibers, filaments, yarns, films, and membranes in the form of flat membranes, hose membranes as well as hollow fiber membranes and the like (DE-A 29 13 589). Processes using N-methylmorpholine-N-oxide have turned out to be particularly suitable; economical interests and development efforts are centered on those processes. Processes for the production of such formed objects using N-methylmorpholine-N-oxide, in the following called NMMO processes, essentially consist in that, first, a suspension is produced from cellulose such as cotton linters, chemical wood pulp and the like, water and NMMO and in that this suspension is transformed into a solution by heating and removing a portion of the water.

This solution is then filtered and extruded through a nozzle into a coagulation bath, preferably with an interim air gap, whereby the formed objects such as filaments, films or membranes are formed via coagulation. These formed objects are then washed to remove any tertiary amine oxide still present. Subsequently the formed object can be dried and further processed in the customary manner, e.g. wound up, etc.

Compared to the classic processes for manufacturing cellulose formed objects, such as the cuprammonium process or in particular the viscose process, the NMMO process is in particular characterized in that it involves essentially physical phenomena, so that at least in theory no chemical reactions take place and no chemical byproducts are formed which must be disposed of as waste products or transformed back by chemical methods into the initial substances. The NMMO process therefore fundamentally ranks among the very environmentally friendly processes. Additionally the actual initial substance is a raw material which grows back, and the cellulose final product is highly biodegradable.

However, particularly during longer and continuous operation it frequently happens that slimy sedimentations are built up, especially in the washing zones, so that the washing water becomes turbid and that splashes of the washing water which reach the interior of the housings erected to protect the washing zone are sites for the growth of mold, algae and the like. These contaminations, which are apparently caused by a biological growth, not only give the installation a dirty appearance, but can contaminate and obstruct other installation parts such as filters, pumps and the like. In this case, agglomerates pose a particular danger, since they can for example abruptly obstruct filters. Additionally such contaminations are also incorporated into the manufactured formed objects, signifying in particular a great danger to membranes, since they are frequently employed in fields such as medicine and food technology, which depend on the highest cleanliness, hygiene, sterility and freedom from toxic substances.

The production installation must therefore be frequently and painstakingly cleaned, which is very labor intensive. Formed objects which are to be germ-free must constantly be intensively sterilized and checked for flawless quality.

Hence there is still a great need for a process which does not show the above mentioned disadvantages and which leads to products with valuable properties.

SUMMARY OF THE INVENTION

The objective of the invention is therefore to provide a process of the type described above by which the formation of algae, fungus, mold and the like does not take place and which provides formed objects such as membranes, among others, which are essentially free of such contaminations, germs and in particular pathogenic germs and the like.

Moreover the objective of the invention is to provide such a process which operates economically and effectively and allows the coagulation bath, the washing water and the solvent to be easily and effectively recovered.

This objective is met by a process for manufacturing formed objects such as fibers, filaments, yarns, films, membranes in the form of flat membranes, hose membranes and hollow fiber membranes and the like, by pressing cellulose solutions in an amine oxide of a tertiary amine, in particular in N-methylmorpholine-N-oxide and if necessary water, through a nozzle and precipitating said solutions in a coagulation bath, washing of the formed objects obtained, whereby the coagulation bath liquid and the washing water is processed if necessary to recover the amine oxide of the tertiary amine; this process is characterized in that hydrogen peroxide, peroxyethanoic acid, ozone or chlorine dioxide is added to the coagulation bath and/or washing water. Hydrogen peroxide containing additionally one or several biocides is preferably used. Also, hydrogen peroxide containing additionally one or several stabilizers is very much suited. It is advantageous to employ hydrogen peroxide amounting to 25 to 10,000 ppm in relation to the coagulation bath liquid or the washing water, especially in amounts of 50 to 500 ppm.

BRIEF DESCRIPTION OF THE DRAWING

The FIGURE is a diagram of a process for manufacturing cellulose formed objects in accordance with the invention.

DETAILED DESCRIPTION OF PREFERRED EMBODIMENTS

Figure 1:
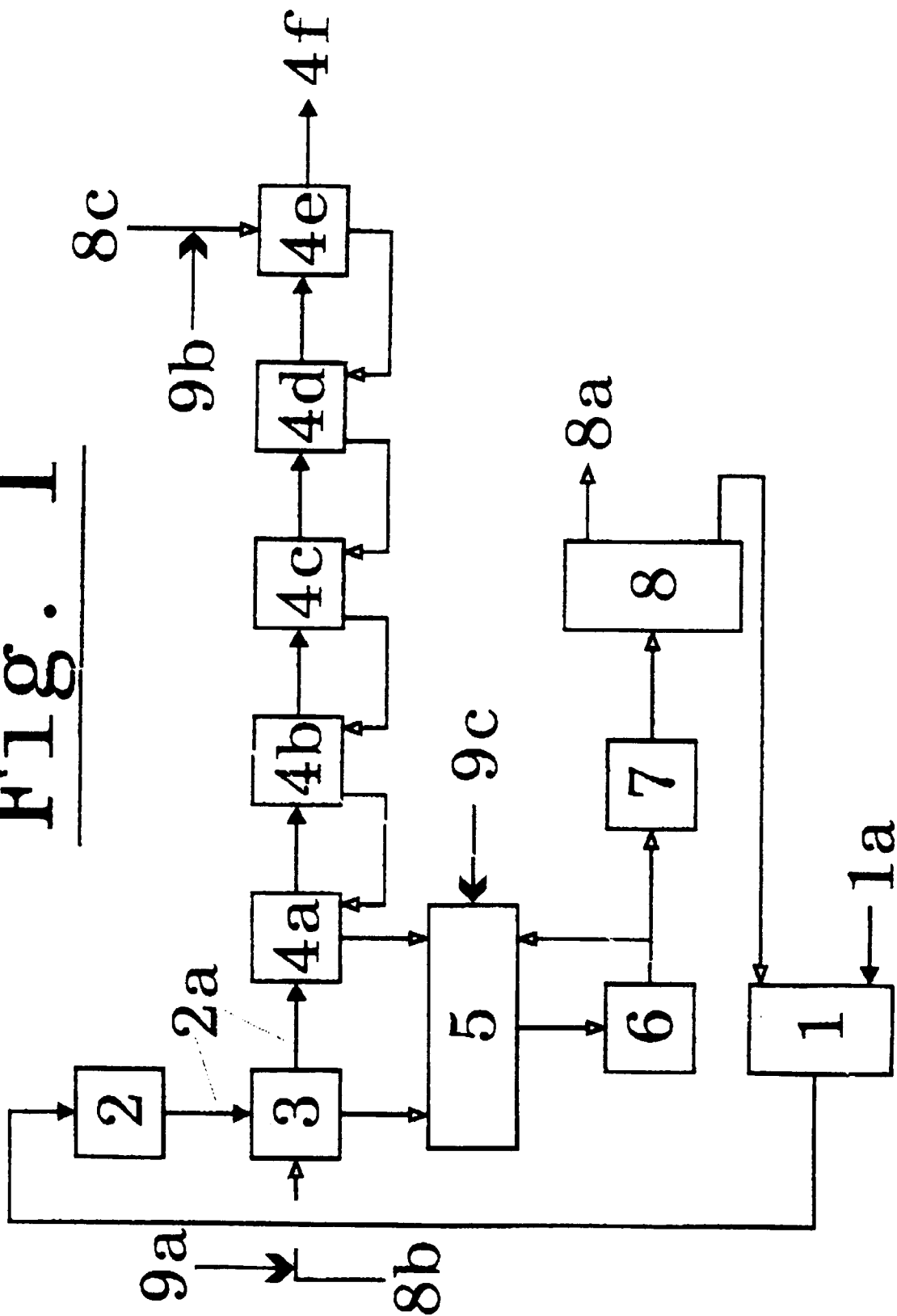

The concentration of peroxyethanoic acid is preferably adjusted to 5 to 250 ppm in relation to the coagulation bath liquid or the washing water. The preferred values for ozone range from 0.05 to 5 ppm and for chlorine dioxide from 0.1 to 2 mg/l coagulation bath liquid or washing water.

The substances stated can be added as a mixture or also in an alternating way, i.e. in rotation.

For example hydrogen peroxide can be dosed together with, for instance, peroxyethanoic acid in a mixture. It is also possible, to separately dose both these components into distinct pipelines at the same site, or at sites which are situated at a distance from each other.

One further advantageous process consists in hydrogen peroxide being added continuously and peroxyethanoic acid, ozone or chlorine dioxide being added at time intervals.

It can be advantageous if the addition of said substances is carried out discontinuously. The addition of the substances can be carried out automatically.

In a particularly advantageous embodiment of the process of the invention the formed objects obtained are washed according to the countercurrent principle, and hydrogen peroxide, peroxyethanoic acid, ozone or chlorine dioxide is added to the last washing step.

In one further particularly preferred embodiment of the process of the invention the coagulation bath and/or the washing water is diverted in order to recover the amine oxide of the tertiary amine, and the remaining hydrogen peroxide, peroxyethanoic acid, ozone or chlorine dioxide is decomposed. This is to be preferably a catalytic decomposition.

Manganese dioxide ($MnO_2$) is particularly suited as a catalyst, especially for the decomposition of hydrogen peroxide. Manganese dioxide in powder form acts particularly well as a catalyst in the process of the invention. It is especially advantageous to employ manganese dioxide which is bound on a carrier. Common carriers on a $SiO_2$ base can serve as carriers, and likewise carriers on a base of $Al_2O_3$ or $Al_2O_3$ and $SiO_2$ are suitable. The reason for this advantage is that the manganese dioxide exhibits a very large surface area compared to the liquid treated, and is simultaneously bound on relatively coarse $SiO_2$ particles, so that no great pressure differences can occur as the solution flows through, or that filter devices for retaining the manganese dioxide powder are not necessary.

It is possible to carry out the catalytic decomposition first and then to guide the quantities of diverted coagulation bath and/or washing water through an ion exchanger for a further conditioning. It is also possible to guide the diverted washing water or coagulation bath liquid, which still contains hydrogen peroxide or peroxyethanoic acid, ozone or chlorine dioxide, first through an ion exchanger and then to carry out a catalytic decomposition.

Materials suited for a catalytic decomposition are, among others, platinum gauze, activated charcoal with palladium/platinum coating, palladium on activated charcoal, palladium on aluminum oxide carriers, as well as activated charcoal alone.

The catalytic decomposition can e.g. be carried out in such way that the washing water solution or the coagulation bath to be regenerated, or a mixture of both, is led over a catalyst bed and through a cartridge which contains the catalyst. The solutions can also be brought into contact with the catalyst in a stirring vessel.

Besides the catalytic decomposition it is also possible within the framework of the invention to decompose in particular hydrogen peroxide by means of enzymes, as for example by means of catalase.

In regards to the catalase, the catalase extracted from beef liver is suited, for example, and can be commercially obtained for example under catalog no. 0106836001 from Boehringer Mannheim GmbH, Mannheim, Germany.

In addition it is also possible to effect the decomposition by means of radiation, e.g. by means of UV light.

For carrying out the process of the invention, common hydrogen peroxide dissolved in water is suited. It can be employed in its pure form, i.e. as a pure aqueous solution without special additives. However, commercially available products such as the product distributed under the commercial name Dioxon 104 by Solvay Interox GmbH, D-82049 Pullach, Germany, are also usable.

The commercial product distributed under the name Bionet by Rohm and Haas, Philadelphia, USA, which consists of a mixture of hydrogen peroxide and peroxyethanoic acid, is also very well suited.

The process of the invention not only offers advantages during the direct manufacture of the formed objects, i.e. flawless operation, particularly in the washing zone, and also provides products containing no or considerably fewer germs and contaminations. The process also advantageously affects the recovery processes which follow the actual manufacturing process of the formed objects or which are carried out in parallel with the manufacturing process. In this way the washing water, which is diverted for the recovery of the amine oxide and first stored in tanks, remains completely clear throughout several weeks of storage, whereas it becomes turbid within a short time if the operation is not carried out according to the process of the invention. Sediments are formed which cause difficulties during further processing. Therefore cleaning of the storage tanks is not necessary, i.e. on the surface of the vessels themselves and on filters possibly attached to the tanks, as well as in the piping systems.

Because the substances used are for the most part decomposed without releasing harmful substances, the recovery step also operates in a manner that is gentle on the environment. By combining decomposition and the usage of ion exchangers, a mixture of water and amine oxide is obtained which can be recovered without problems, so that the amine oxide obtained is of an excellent quality and can be employed again in the manufacturing process. The separated water is of an excellent quality, so that it can be employed again as coagulation bath liquid or as washing water, or it can be disposed of without further problems.

The process can be employed for processing common cellulose such as cotton linters, chemical wood pulp as well as cellulose on a wood basis. Likewise cellulose types which have been pulped according to the various processes are suited, e.g. by means of sulfite and sulfate pulping, with water vapor under high pressure, and wood treated by means of expansion of an explosive type (water extracted exploded wood: see Polymer Communications 1986, Vol. 27, June, pages 171-2). The cellulose can also be kier-boiled, bleached, activated or pretreated in some other way. Types of cellulose which already have a very strong tendency toward germ development, algae formation and the like, are also suited.

The process of the invention not only permits a flawless washing at room temperature but it also allows for the operation of the washing process at higher temperatures, e.g. 70° to 90° C.

In some cases it can be advantageous to dose one or several substances into the storage tank or into the intermediate tank, in addition to the dosage of the substances into the coagulation bath and/or washing zone, particularly if great quantities of washing water and coagulation bath liquid accumulate and are either first stored for reprocessing or in the case of a continuous treatment are guided through a standpipe with a very large volume where the retention time is relatively long.

It is of course also possible to operate the process outside of the concentration ranges stated to be preferred. It is possible to carry out, for instance, the process with a hydrogen peroxide concentration below 25 ppm, e.g. with 10 ppm or above 10,000 ppm, e.g. 25,000 ppm.

Ozone is preferably used in enclosed installations, i.e. in such installations where such covers exist for the coagulation bath and the washing zones, so that between the external atmosphere in which the operating personnel of the installation move, and the atmosphere above the coagulation bath and around the washing zones, no or only a negligible exchange takes place. Furthermore, the suitable concentration of the substances used can be optimized from case to case with a few experiments.

The invention will be explained in the following in further detail with reference to FIG. 1.

In a manner known per se, a 14% spinning solution is produced in container (1) from cellulose wood pulp (supplied via pipe 1d), N-methylmorpholine-N-oxide and water. This is carried out by heating the initial components as they mix with each other and by removing some of the water, whereby a solution is formed.

This solution is fed into a spinneret (2), extruded under pressure through the nozzle orifices, whereby a filament (2a) is formed that is composed of several single filaments which, after passage through an air gap, reaches an aqueous coagulation bath (3), where the coagulation of the filaments takes place and the greater part of the solvent is extracted. Fresh water or condensate from the recovery process (8) is further dosed into the coagulation bath via a pipe (8b) to maintain the level of the coagulation bath. Additionally, every two hours a 35% hydrogen peroxide solution (Dioxon 104) is added to the coagulation bath via pipe (9a) in such quantities that a mean hydrogen peroxide concentration of 100 ppm results in the coagulation bath.

The coagulated filament is then guided through a washing zone containing several steps (4a to 4e). The washing takes place according to the countercurrent principle, whereby fresh water in step (4e) is added via a pipe (8c). The washing water of (4e) is used for the washing process in the step (4d). The consumed water flows from (4d) to (4c) etc. until the water which is enriched with N-methylmorpholine-N-oxide, after the passage through the washing zone (4a), is led into a storage tank (5). Via pipe (9b) hydrogen peroxide is continuously added in such quantities that the washing water employed in step (4e) exhibits a hydrogen peroxide concentration of 100 ppm. The filament is subsequently conveyed to additional after-treatment steps such as e.g. drying, winding up and the like. The temperature of the washing water amounts to 75° C., the temperature in the storage tank amounts to 35° C. The contents of the storage tank are circulated through a filter (6) and from time to time fed back via the filter (6) to an ion exchanger (7) and to the solvent recovery process (8). The catalytic decomposition (which is not depicted in the diagram) takes place before the ion exchanger (7). Manganese dioxide on a $SiO_2$ carrier is used as a catalyst.

The recovery process of the coagulation bath or the washing water liquid is carried out by evaporation and condensation of the water.

The pipe (8) serves to convey the recovered water, which can be used again directly. Via pipe 9c, for instance, hydrogen peroxide can be dosed into the tank (5) which serves as a storage container or a standpipe.

With the above described procedure the installation can be operated in three shifts over the course of several days before a first cleaning is indicated.

If the operation is carried out under the same conditions, but without adding hydrogen peroxide according to the invention, the installation must be cleaned at least three times per working day, i.e. during 8 hour shifts cleaning is necessary at least once at the beginning or end of each shift and the installation must therefore be shut down.

It was particularly surprising that it is possible, due to the process of the invention, to master the production process so that the undesired development of algae, germs, slime-like sedimentations and the like no longer occurs and that the formed objects obtained are for the most part free of the undesired components. This is especially advantageous for the production of membranes, for which the highest demands concerning cleanliness are made.

The process works in a manner that is very easy on the environment, since there are almost no waste products.

Moreover its operation is very economical since only very small quantities of hydrogen peroxide, ozone, peroxyethanoic acid or chlorine dioxide are needed.

We claim:

1. Process for manufacturing a cellulose formed object comprising pressing a cellulose solution in an amine oxide of a tertiary amine and optionally water through an orifice and precipitating in a coagulation bath to form the object, and washing the formed object obtained with a washing liquid, wherein one or more of hydrogen peroxide, peroxyethanoic acid, ozone and chlorine dioxide is added to at least one of the coagulation bath and the washing liquid.

2. Process according to claim 1, wherein hydrogen peroxide is added that additionally contains one or more biocides.

3. Process according to claim 1, wherein hydrogen peroxide is added that additionally contains one or more stabilizers.

4. Process according to claim 1, wherein the washing is conducted in a plurality of washing steps and is performed such that the washing liquid is introduced at a last washing step and is fed countercurrently to a direction of travel of the formed object through the plurality of washing steps, and wherein the one or more of hydrogen peroxide, peroxyethanoic acid, ozone and chlorine dioxide is added to the last washing step.

5. Process according to claim 1, wherein hydrogen peroxide is added to either or both the coagulation bath or washing liquid in quantities of 25 to 10,000 ppm.

6. Process according to claim 5, wherein hydrogen peroxide is added to either or both the coagulation bath or washing liquid in quantities of 50 to 500 ppm.

7. Process according to claim 1, wherein the one or more of hydrogen peroxide, peroxyethanoic acid, ozone and chlorine dioxide is added discontinuously.

8. Process according to claim 1, wherein the one or more of hydrogen peroxide, peroxyethanoic acid, ozone and chlorine dioxide is added automatically.

9. Process according to claim 1, wherein two or more of hydrogen peroxide, peroxyethanoic acid, ozone and chlorine dioxide are added in rotation.

10. Process according to claim 1, wherein two or more of hydrogen peroxide, peroxyethanoic acid, ozone and chlorine dioxide are added in combination.

11. Process according to claim 1, wherein hydrogen peroxide is added continuously, and one or more of peroxyethanoic acid, ozone and chlorine dioxide is added discontinuously.

12. Process according to claim 1, wherein either or both the coagulation bath liquid and washing liquid is further processed for recovery of the amine oxide of the tertiary amine.

13. Process according to claim 12, wherein hydrogen peroxide, peroxyethanoic acid, ozone or chlorine dioxide remaining in either or both the coagulation bath and washing liquid diverted for recovery of the amine oxide of the tertiary amine is decomposed.

14. Process according to claim 13, wherein the decomposition is carried out catalytically.

15. Process according to claim 14, wherein manganese dioxide ($MnO_2$) is the catalyst for the catalytic decomposition.

16. Process according to claim 15, wherein manganese dioxide bound on a $SiO_2$ carrier is the catalyst for the catalytic decomposition.

17. Process according to claim 13, wherein the decomposition is carried out by enzymes.

18. Process according to claim 13, wherein either or both the diverted coagulation bath liquid and washing liquid are, after the decomposition, led through an ion exchanger for further processing.

19. Process according to claim 13, wherein either or both the diverted coagulation bath liquid and washing liquid are first led through an ion exchanger and any remaining hydrogen peroxide, peroxyethanoic acid, ozone or chlorine dioxide is then decomposed.

20. Process according to claim 1, wherein the cellulose formed object is a fiber, a filament, a yarn, a film, a flat membrane, a hose membrane or a hollow fiber membrane.

21. Process according to claim 1, wherein the cellulose solution contains N-methylmorpholine-N-oxide and water.

22. Process according to claim 1, wherein the washing liquid is water.

* * * * *